May 22, 1962 — O. G. HØYER — 3,035,686
MACHINE FOR THE PRODUCTION OF SOLIDIFIED
MOULDED BODIES BY REFRIGERATION

Filed Dec. 22, 1958 — 5 Sheets-Sheet 1

INVENTOR:
Oluf G. HØYER

BY: Wenderoth, Lind & Ponack
ATTORNEYS

May 22, 1962 O. G. HØYER 3,035,686
MACHINE FOR THE PRODUCTION OF SOLIDIFIED
MOULDED BODIES BY REFRIGERATION
Filed Dec. 22, 1958 5 Sheets-Sheet 2

INVENTOR:
Oluf G. HØYER

BY: Wenderoth, Lind + Ponack
ATTORNEYS

May 22, 1962  O. G. HØYER  3,035,686
MACHINE FOR THE PRODUCTION OF SOLIDIFIED
MOULDED BODIES BY REFRIGERATION
Filed Dec. 22, 1958  5 Sheets-Sheet 3

INVENTOR:
Oluf G. HØYER

BY: Wenderoth, Lind & Ponack
ATTORNEYS

May 22, 1962 O. G. HØYER 3,035,686
MACHINE FOR THE PRODUCTION OF SOLIDIFIED
MOULDED BODIES BY REFRIGERATION
Filed Dec. 22, 1958 5 Sheets-Sheet 4

INVENTOR:
Oluf G. HØYER
BY: Wenderoth, Lind + Ponack
ATTORNEYS

May 22, 1962     O. G. HØYER     3,035,686
MACHINE FOR THE PRODUCTION OF SOLIDIFIED
MOULDED BODIES BY REFRIGERATION
Filed Dec. 22, 1958     5 Sheets-Sheet 5
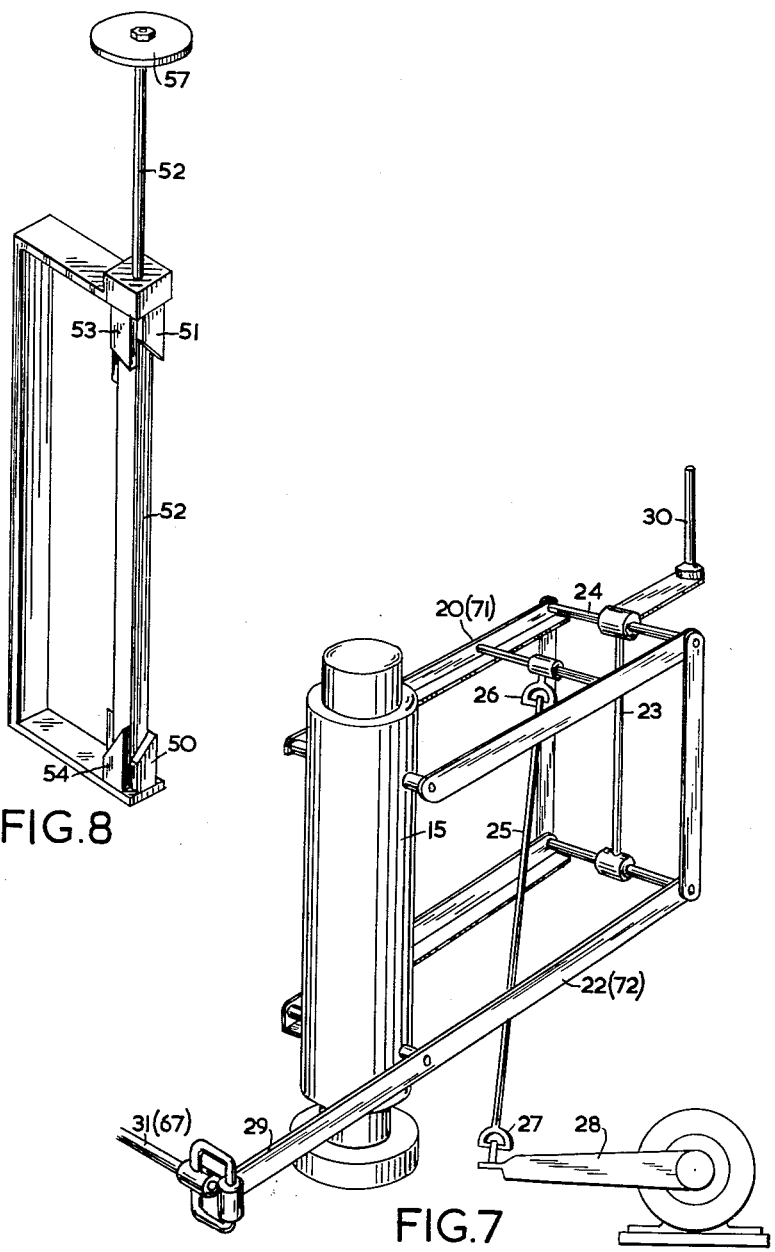
INVENTOR
OLUF GUDMUND HØYER
BY Wenderoth, Lind & Ponack
ATTORNEYS US patent

United States Patent Office 3,035,686
Patented May 22, 1962

3,035,686
MACHINE FOR THE PRODUCTION OF SOLIDIFIED
MOULDED BODIES BY REFRIGERATION
Oluf Gudmund Høyer, 131 Ny Munkegade,
Aarhus, Denmark
Filed Dec. 22, 1958, Ser. No. 782,287
Claims priority, application Denmark Dec. 17, 1954
14 Claims. (Cl. 198—209)

This invention relates to machines for producing solidified moulded bodies, especially ice-cream bricks, and is a continuation-in-part of the application Serial No. 552,-591, now abandoned.

The invention especially relates to machines having a ring-shaped mould with refrigerating cells which mould is divided into several individual parts or sections, so that the mould can easily be exchanged with another mould by taking each single part or section of the rather heavy mould separately and exchanging it with another mould part having refrigeration cells of another shape and/or size. The division of the mould in separate handy parts involves the advantage that a single operator without the aid of hoisting apparatuses can remove the rather heavy mould and insert another mould. Further the manufacture and storing of the moulds become easier and require less room. However, a certain difficulty arises in that the advancing of the mould step by step during the freezing process cannot be made as easily as with an undivided mould, because all the advancing steps cannot be made of equal length. This is due to the fact that within each single section of the mould the available area must hold as many freezing cells as possible arranged in radial rows. Owing to the division it is not possible to arrange the radial rows in a regular pattern with equal angular distance between any two adjacent rows because the angle between two adjacent radial rows within a mould section cannot always be the same as the angle between two adjacent rows each belonging to one of two abutting mould sections.

It is an object of the present invention to avoid this difficulty, and provide for means that automatically switches over from one to the other and vice versa of two paired advancing steps required for operating a single mould consisting of a number of equal sections.

A further object of the invention is to provide manually adjustable means for manually adjusting the length of the paired steps, in order to prepare the machine to work with different moulds having different configurations of refrigerating cells.

The invention is applicable in connection with a machine as described in U.S. Patent 2,791,890, and although it can be used in connection with machines of other types the invention will now be further described with reference to a machine of said type and to the accompanying diagrammatical drawings in which FIG. 1 shows a plan view of an embodiment of a machine according to the invention, FIG. 2 is part of a diametral section through the machine in the immediate vicinity of the thawing zone and the advancing mechanism, corresponding to the section shown in FIG. 3 in U.S. Patent 2,791,890, FIG. 3 is an embodiment of the mechanism for automatically switching the length of the step, FIG. 4 is a section along the line IV—IV in FIG. 3, FIG. 5 is a diagram illustrating another embodiment of the mechanism for automatically switching of the length of the step;

FIG. 7 is a perspective view of the parallelogram linkage of FIG. 2; and

FIG. 8 is a perspective view of the adjustment rod with the pairs of stop members thereon.

Figure 1:
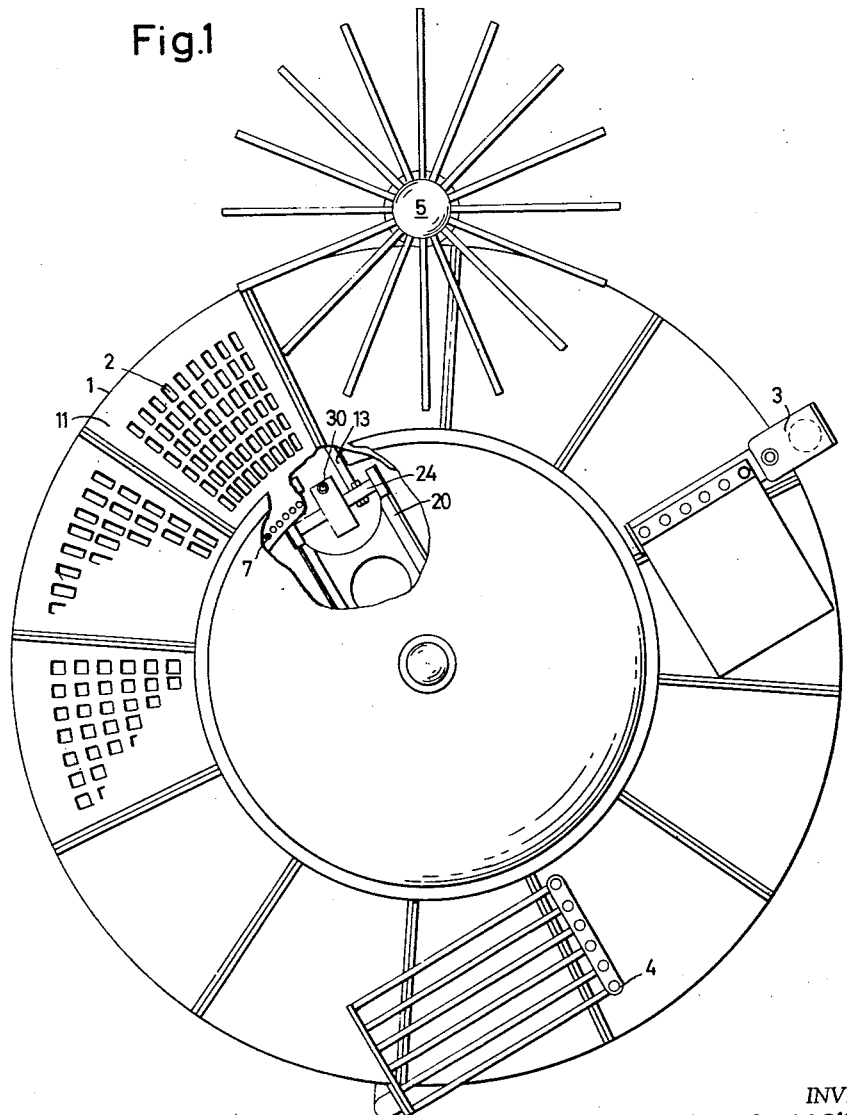

The machine shown on the drawing comprises an annular refrigerating mould 1 which is divided into a number of mould sections of which only three adjacent sections denoted 1a, 1b and 1c are shown in detail with refrigerating cells. The three mould sections actually belong to three different moulds but are shown in order to illustrate some possible differences in configuration of refrigerating cells. Along the periphery of the refrigeration mould there are, as appears from FIG. 1, a filling apparatus 3 for filling the cells 2 with liquid or plastic raw material, a stick fitting device 4 for inserting sticks into the half frozen moulded bodies, and a picking-up apparatus 5 which may be combined with a device (not shown) for coating the moulded bodies with chocolate.

Within each mould section the cells 2 are arranged in a configuration corresponding to the pattern of crossing points of a number of concentric circles and radial lines, so that each cell belongs to a circular row as well as to a radial row.

The mould sections 1a, 1b, 1c etc. (FIG. 1) are by any appropriate means, such as bolts, mounted on a carrying spider 6 (FIG. 2), which is mounted so as to be rotatable around a fixed central axle 8 (FIG. 2) for instance in the manner disclosed in FIG. 3 in U.S. Patent 2,791,890. Therefore, it is considered superfluous to describe the mounting in detail in this application.

In principle the advancing of the refrigeration mould 1 is carried out by means of an advancing rod arranged below a circular row of holes in the mould 1, part of which circular row of holes is shown in FIG. 1 by the reference 7. Since the holes are hidden from the view in FIG. 1 part of the machine is cut away to show the row of holes. In a manner which will be described in more detail later on the advancing member moves upwards through one of the holes, and is thereafter rotated through an angle corresponding to the angle between two radial rows of refrigerating cells thereby bringing the mould along. At the end of this rotational movement the advancing rod is withdrawn, and when out of contact with the mould, is rotated in the opposite direction so as to be returned to its initial positions, in which it is ready to move upwards again and contact the mould through the adjacent hole. It will be obvious to the man skilled in the art that any appropriate means such as knobs, impressions or the like on the mould presenting surfaces which can be attacked by the driving member can be used for transmitting the advancing movement from the driving member to the mould.

Figure 2:
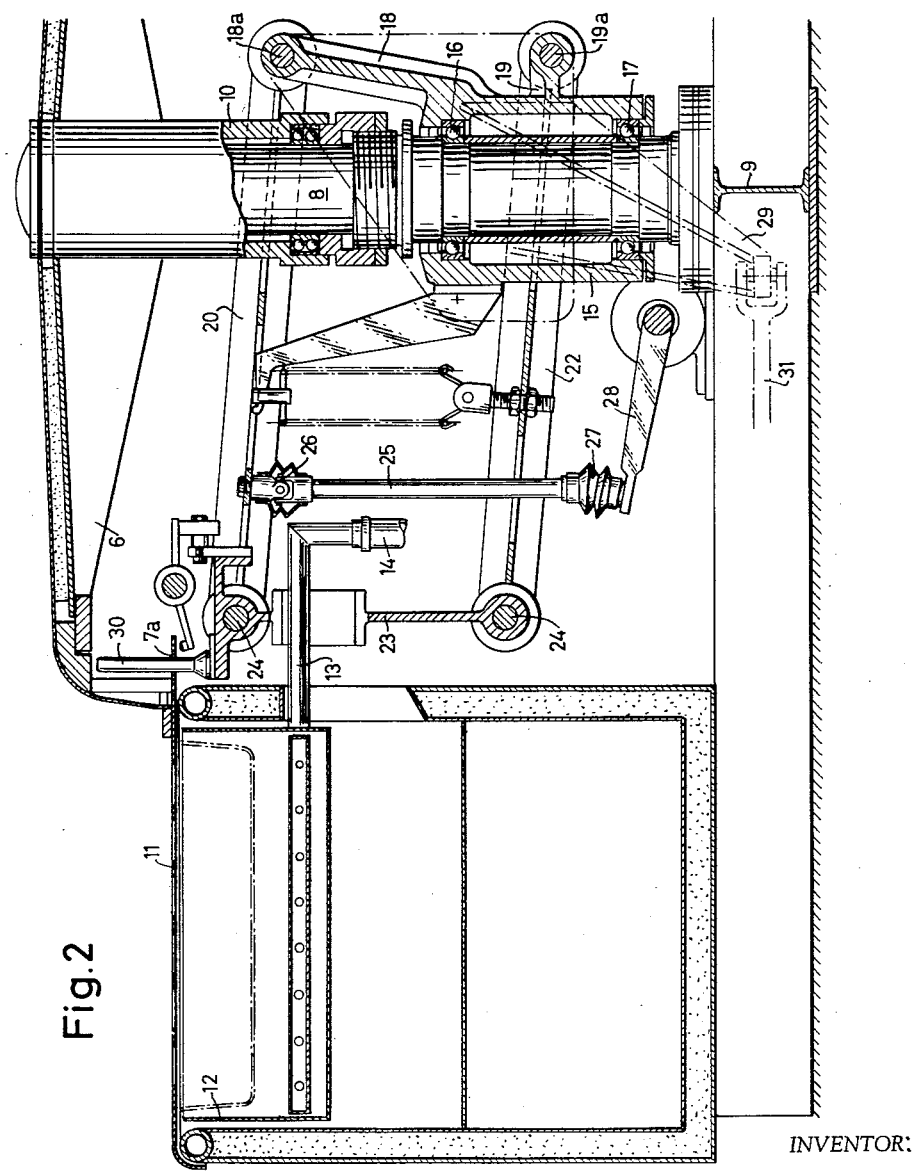

In FIG. 2 is shown part of a section through the machine. The central fixed axle 8 rests on a support 9, and carries a freely rotatable sleeve 10, on which the spider 6 is mounted. The spider supports the mould 11 from which refrigerating cells, not shown, hang down into a thawing vessel 12 carried by a hollow supporting member 13 serving at the same time as an inlet tube for thawing liquid which is conveyed to the tube by means of a flexible tube 14. Around the lower part of the axle 8 is mounted another sleeve 15 supported by bearings 16 and 17. In fixed connection with the sleeve 15 are mounted two arms 18 and 19. An arm 20 is pivoted to the arm 18 at 18a, and another arm 22 is pivoted to the arm 19 at 19a. To the free ends of the arms 20 and 22 is pivoted an arm 23. The pivots are denoted 24. The arms 20, 22 and 23 represent the three sides of a parallelogram permitting the arm 23 to be moved down and up by means of an actuating arm 25 which is connected to arm 20 by a universal joint 26 at the upper end thereof and at the lower end is connected by another universal joint 27 to a rocking member 28 driven by means of a cam mechanism, not shown, from the main shaft of the machine, not shown.

The sleeve 15 can be oscillated around the axle 8 by means of an arm 29 shown in dot and dash line. The oscillating movement is likewise derived from the main shaft of the machine through a cam mechanism or the like, not shown.

The arm 23 carries at its upper end a driving member or rod 30 which in the position shown in FIG. 2 passes through a hole 7a in the mould 11. This hole 7a is one of the holes in the circular row 7 shown in FIG. 1.

FIG. 2 shows the different parts in the position just after the advancing steps has been carried out. In operation the next movement will be a pull in the actuating arm 25 by means of the rocking arm 28 so as to pull the parallelogram system 20, 22 and 23 downwards, and thereby disengaging the driving rod 30 from the mould 11. By this movement the thawing vessel 12 with supporting arm 13 is likewise pulled downwards. With the rocking arm 28 remaining in the lower position the sleeve 15 is rotated by means of the arm 29 through an angle corresponding to the advancing step in question and is kept in this position while the rocking arm 28 moves upwards, and pushes the driving rod 30 through an adjacent hole in the mould 11. While the parallelogram system 20, 22 and 23 and thereby the driving rod 30 remains in the upper position the sleeve 15 is again rotated through the same angle as before, but in the opposite direction thereby causing the driving rod 30 to advance the mould 11 and the spider 6 one step forward.

This procedure is continued when the machine is working with the only difference being that the advancing step determined by the angle through which the arm 29 is rotated is varied depending on whether the radial row of refrigerating cells standing just below the filling apparatus is the last radial row in a mould section or not.

Figure 3:
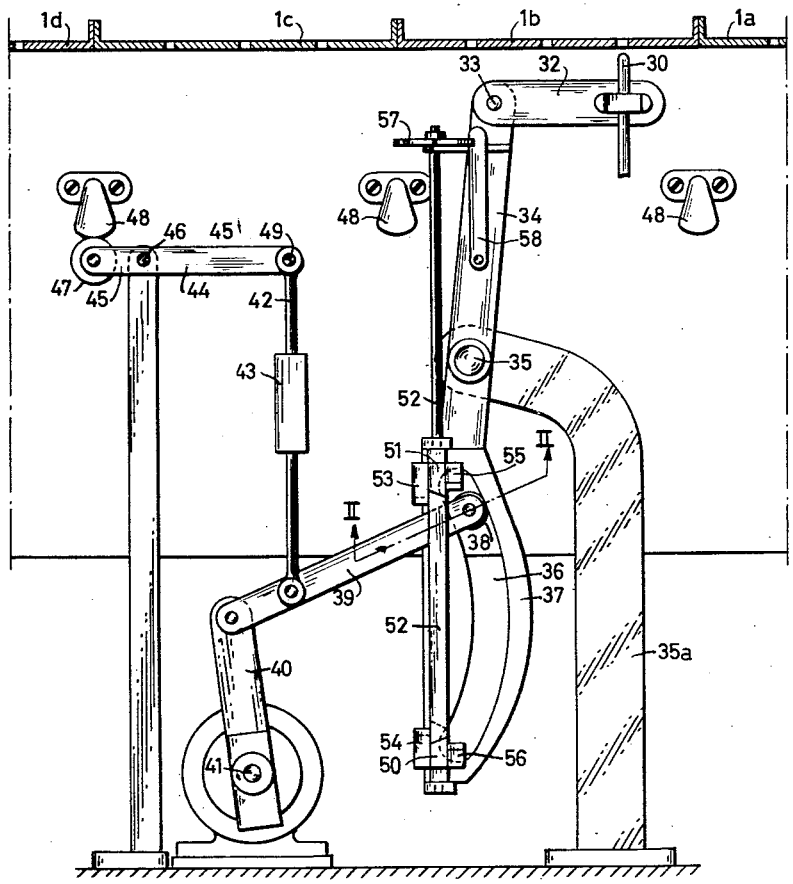
Figure 4:
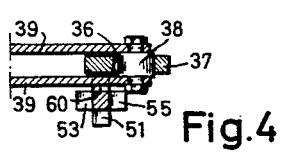

An embodiment of the means for automatically changing the length of the advancing steps will now be described in connection with FIGS. 3 and 4. For the sake of simplicity the driving rod 30 is shown in FIG. 3 as being actuated directly by means of the advancing mechanism, but it will be understood from FIG. 2 that this advancing mechanism is actually acting on the arm 29 through an appropriate link. Therefore in practice the driver arm 31 shown in FIG. 2 can be regarded as being connected with the driver arm 32 in FIG. 3.

In FIG. 3 the driving member or driver 30 is movable up and down in the manner already described, and is shown accommodated displaceably in the driver arm 32 which in the transversal direction is acting as a guide for the up and down moving driver 30.

The driver arm 32 is, e.g. by means of a ball bearing, which may be a spherical ball bearing 33, connected to one end of a double-armed lever 34 journalled at 35 in a support 35a. The lower arm of the double-armed lever 34 is provided with a slot 36 in the form of an arc.

Guided in the slot 36 is a roller 38 which can be moved downwards from the position shown to a lower position near the bottom of the slot 36. The roller 38 is mounted on one end of a driving rod 39 which at its other end is rotatably connected to a driving arm 40 which is in fixed connection with a driving shaft 41 connected to the main shaft of the ice-cream machine preferably through a cam or curve mechanism in such a way that the driving arm is made to perform a rocking or reciprocating movement which is to be transmitted to the driver 30 and thereby to the freezing table. The length of the rod 39 is at least approximately equal to the radius of the arc 36.

The length of the advancing step is determined by the location of the roller 38 in the slot 36. If the roller 38 is located at the upper end of the slot 36, a large step is obtained, and if the roller 38 is at the lower end of the slot 36, a small step is obtained, provided that the amplitude of the rocking movement of the driving arm 40 is constant. The magnitude of the advancing step depends on the distance between the journal 35 of the double-armed lever 34 and the point of attack of the roller 38 on the lever arm 37.

Due to its weight the driving rod 39 will without outside actuation be located in the lower position, which gives the smaller advancing step corresponding to normal advance of the freezing table with a value corresponding to the normal angle between two radial adjacent rows within a mould section. For the purpose of automatically switching the mechanism to perform a large advancing step corresponding to the distance between an outer row in a mould section and an adjacent outer row in the following mould section a two part control rod 42 is provided, in which between the two parts is inserted a spring which is mounted in a spring case 43 acting at the same time as a balancing weight for the driving rod 39. The control rod 42 is connected by means of a spherical ball bearing 49 to the end of a double-armed lever with arms 44 and 45 and a fulcrum 46. At one end the arm 45 carries a roller 47 which co-operates with cams 48 which are secured to the freezing table or another suitable member following the movement of the mould. The cams 48 are situated along a circle with a point of the axis of rotation of the freezing table as center.

As the mechanism is mounted inside the machine along the cylindrical wall of the latter, part of the levers lying in the direction of the circumference of the cylinder are preferably curved. Thus the lever 44, 45 will for example in a plane at right angles to that of the drawing appear as a curved rod.

During the normal advance movement the driving rod 39 is, as mentioned above, located in its lowest position determined by a stop member 50 but when a cam 48 contacts the roller 47, the latter is moved downwards to the position shown in FIG. 3, and hereby the arm 44 moves upwards and lifts the control rod 42 which in turn lifts the driving rod 39 into its uppermost position determined by another stop member 51. Hereby the driving rod 39 is made to actuate the short arm on the double-armed lever 34, so that the advance movement of the driver 30 becomes correspondingly larger. As soon as the cam 48 has passed the roller 47, the control rod system and thereby the driving rod 39 will return to the normal lower position.

The stop members 50 and 51 mentioned above are in the example shown located on one side surface of an adjustment rod 42 of rectangular cross section which is mounted rotatably around its longitudinal axis on the arm 37. The position of the two stop members on the adjustment rod can be adjusted manually. On the three other surfaces of the adjustment rod 52 pairwise associated stop members are provided, three pairs of which, viz. 50, 51 and 53, and 54 and 55, 56 are shown in FIG. 3. The fourth pair is concealed by the adjustment rod 52. However one member 60 of this pair is shown in the cross section in FIG. 4 and both members 60 are shown in FIG. 8.

The two stop members 60 which are active in the position shown lie between the arm 37 of the double-armed lever and the adjustment rod 52, the driving rod 39 consisting of two parallel parts with the roller 38 in between being then guided with one part in the clearance between the lever arm 37 and the adjustment rod 52.

At top the adjustment rod 52 carries an adjustment disc 57 with adjustment notches intended for engagement with an arresting member, e.g. a leaf spring 58, so that the adjustment disc and thereby the adjustment rod 52 are fixed in the desired position.

The purpose of the use of several sets of stop members is that it should be possible to perform a quick switching of a pair of advancing steps of the driver 30 corresponding to the mould inserted into the machine, so that the machine can easily be switched from one type of production to the other, and still work correctly and automatically irrespective of which mould is inserted. The correct location of the stop members on the adjustment rod 52 can be arranged by turning the adjustment disc to adjust the advance movement to a value to correspond to the mould mounted in the machine at the particular time.

In the example described there are, as mentioned above, four sets of stop members, but the number may be increased or reduced. The adjustment rod may have a number of side surfaces corresponding to the number of associated pairs of stop members, e.g. three, four or five.

Instead of cams 48, a continuous curve path may be used, against which the control rod 42 is held in contact via a roller.

The cam 48 or the said curve path need not be mounted materially on the freezing table, but may be provided in the form of a special mechanism, the movement of which is synchronized with that of the freezing table.

Other details of the mechanism may likewise be varied within the scope of the invention. Thus the arresting tongue 58 may be replaced by a leaf spring which lies in contact with the side surface of the adjustment rod 52, and in this case the adjustment disc 57 should only be provided with marks corresponding to a given adjustment. The mark may indicate directly to which size of ice-cream bricks the associated stops correspond. The adjustment rod 52 may be connected through a flexible shaft to an operating handle on the operation panel of the ice-cream brick machine.

Figure 5:
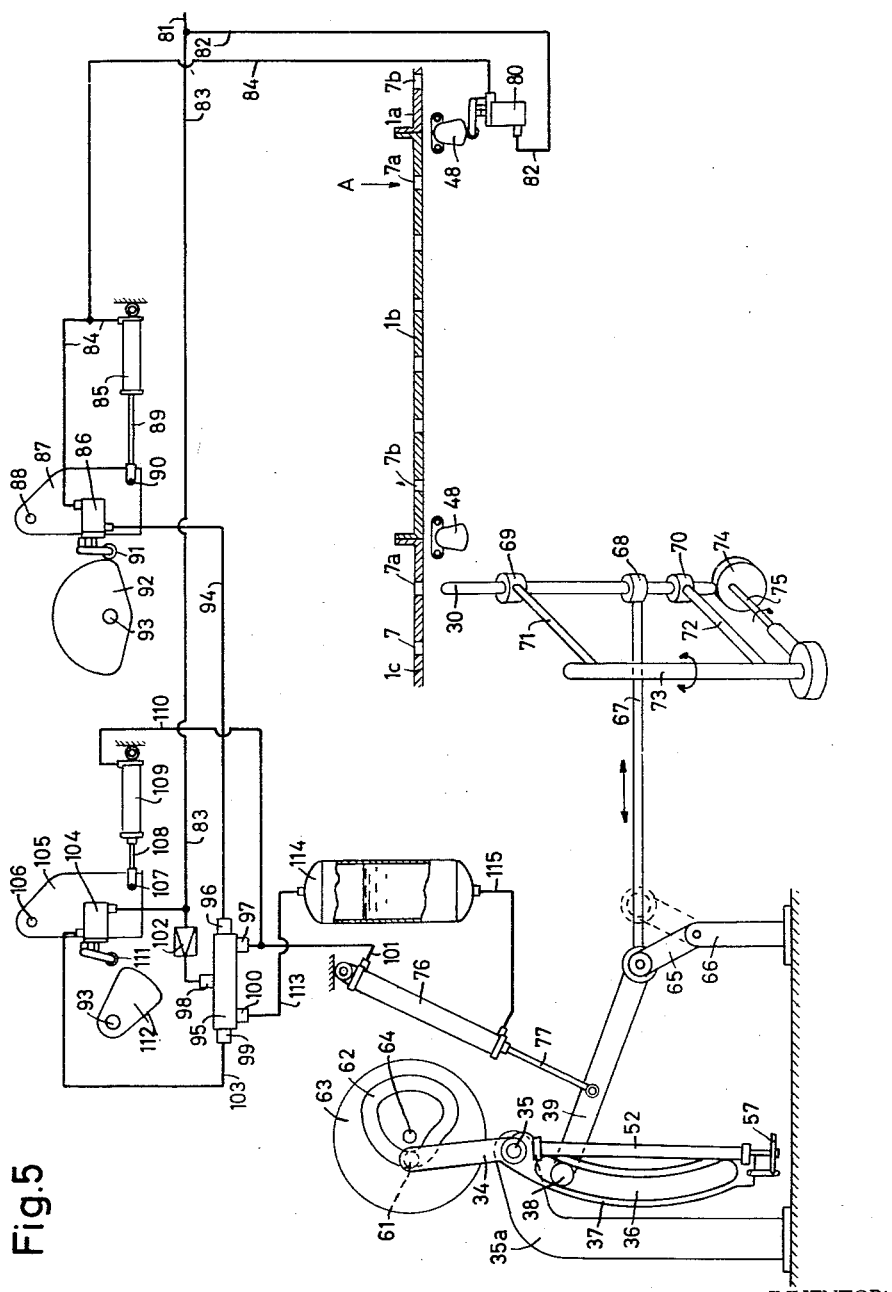

In the embodiment shown in FIG. 5 in a purely diagrammatic way those parts which correspond to parts in FIG. 3 are denoted by the same reference numeral. In FIG. 5 the arm 34 of the double-armed lever 34, 37 carries a roller 61 guided in a guideway 62 in the surface of a disc 63 fixed on the main shaft 64 of the machine or on an auxiliary shaft rotating synchronously with the main shaft. The power transmitting arm 39 which carries the roller 38 at one end is at the other end pivoted to a link 65 which is pivoted to a support 66. The length of the arm 39 is equal to the radius in the circle of which the slot 36 is a part. In the position shown in FIG. 5, therefore, the arm 39 can be moved from the upper to the lower position without jamming of the roller 38 in the slot 36. An arm 67 is pivotally connected to the arm 39, and carries at the free end a sleeve 68 through which the driving rod 30 can slide. The driving rod 30 is guided by two other sleeves 69 and 70 mounted at the ends of two arms 71 and 72, fixed on a vertical axle 73 corresponding to the sleeve 15 on the central axle 8 in FIG. 2. This arrangement permits, as the arrangement in FIG. 2, an angular movement of the driving rod 30 without preventing the driving rod from moving up and down through the sleeves 68, 69 and 70 when actuated by a cam 74 mounted at the end of an axle 75 and deriving its movement from the main shaft.

The arrangement described serves to illustrate the principle, and is, therefore, drawn diagrammatically only. In practice the driver arm 31 in FIG. 2 can be identified with the arm 67 in FIG. 5. The elements 74 and 75 in FIG. 5 correspond to the elements 25, 26, 27, and 28 in FIG. 2, while the elements 69 through 73 correspond to the parallelogram system in FIG. 2.

In order to control the length of the step of the driving rod 30 a piston and cylinder mechanism 76 is provided, the piston rod 77 of which is pivoted at the free end to the arm 39.

The functioning of the piston and cylinder mechanism 76 is controlled through pipes from a valve 80 actuated by cams 48 or the like preferably in fixed connection with the freezing table and thereby with the mould. It will be obvious to the man skilled in the art that the valve 80 can be controlled by any other mechanism moving synchronously with the mould.

The piston and cylinder mechanism 76 can be operated by pressure or by vacuum. In the embodiment shown in FIG. 5 a pressure medium is fed to the control system through an inlet pipe 81 having two branches 82 and 83. The pressure source, which may be for instance a compressor or the like, is not shown. The pipe 82 is connected to the valve 80 and from the valve 80 a pipe 84 leads to a piston and cylinder mechanism 85 and to a valve 86 mounted on a ground or base plate 87 pivoted at 88. The piston rod 89 of the piston and cylinder mechanism 85 is pivoted to the plate 87 at 90. The valve 86 is actuated through a roller 91 by a cam 92 fixed on a shaft which is rotating with the same speed as the main shaft of the machine. The pipe 84 is connected to the valve 86, and the valve 86 is further connected through a pipe 94 to a change-over valve 95 having five inlets and outlets 96, 97, 98, 99, and 100.

The outlet 97 is connected through a pipe 101 to the piston and cylinder mechanism 76. The inlet 98 is connected through a one-way valve 102 to the pipe 83. The inlet 99 is connected through a pipe 103 to a valve 104 mounted in the same way as the valve 86 on a base plate 105 pivoted at 106. The plate 105 is pivoted at 107 to the piston rod 108 of a piston and cylinder mechanism 109, the cylinder of which is connected through a pipe 110 to the outlet 97 on the change-over valve 95. The cylinders of the three piston and cylinder mechanisms are pivotally mounted at one end.

The valve 104 is operated through a roller 111 by a cam 112 mounted on the same shaft as the cam 92 which may be the main shaft or an auxiliary shaft rotating synchronously with the main shaft.

The outlet 100 on the change-over valve 95 is connected through a pipe 113 to the top of a chamber 114 containing a liquid preferably oil. The bottom of the chamber 114 is connected through a pipe 115 to the cylinder in the piston and cylinder mechanism 76.

The up and down movement of the driving rod 30 has a constant amplitude as previously described. The advancing movement transmitted to the driving rod 30 through the arm 67 is, however, carried out with two different amplitudes, which is a normal or single step and a larger or double step.

In operation the change-over is carried out in the following way:

FIG. 5 illustrates the situation just in the moment when the control mechanism is going to change over from a normal step to a long step. The filling apparatus is supposed to stand just above the radial row of refrigerating cells corresponding to the hole 7a in the mould 1b as indicated with the arrow A. The driving rod has just been pulled out of the hole 7a in the mould section 1c, and is to be moved into a position just below the hole 7b. The cam 48 opens the valve 80, thereby supplying pressure medium to the valve 86 and the piston and cylinder mechanism 85 which turns the base plate 87 thereby bringing the roller 91 of the valve 86 in a position in which it can be contacted by the cam 92. The valve 86 is opened immediately after the termination of the advancing step. Thereby pressure medium is conveyed through the pipe 94 and inlet 96 to the change-over valve 95, so that this valve connects the inlet 98 with the outlet 97, pipeline 101 and upper part of the cylinder in the piston and cylinder mechanism 76. The pressure on the piston in the closed cylinder moves the piston rod 77 and thereby the arm 39 from the upper position to the lower position. At the same time the pressure in the chamber 114 and in the lower end of the said closed cylinder is released through the pipe 113. Pressure medium is also fed from the outlet 97 through the pipe-line 110 to the piston and cylinder mechanism 109 whereby the plate 105 is turned around the fulcrum 106 so as to bring the roller 111 of the valve 104 in a position, in which it can be contacted by the cam 112. However, contact does not occur immediately because the cam has just passed the roller 111. During the rotation of the cam 112 from the position shown and until it contacts the roller 111, the advancing movement is carried out through the double-armed lever 34, 37. When the double-armed lever 34, 37 has carried out a forward and backward stroke, and has returned to the position shown, the cam 112 by means of the roller 111 opens the valve 104 so that pressure medium is fed from the pipe 83 through the valve and the pipe 103 to the inlet 99. This results in the returning of the change-over valve 95 to the initial position in which pressure is applied to the pipe 101, to the chamber 114 and through the pipe 115 to the bottom of the cylinder in the piston and cylinder mechanism 76. The presure in the top of the cylinder is released through the pipe 101, inlet 97 and change-over valve 95. Likewise the pressure in the cylinder 109 is released through pipe 110. Since the valve 80 is now closed the pressure in the cylinder 85 is also released. The main object of the arrangement described is to insure that change-over of the arm 39 takes place when the moving parts are at rest. A further object is to avoid unnecessary wear of the valves. The ratio between the numbers of short steps and long steps is generally around 10:1 or 15:1. If the valves are not pivotally mounted they would have to be actuated 10–15 times without actually serving to bring forth a switching of the arm 39. Also there would be a certain loss of pressure medium.

Figure 6:
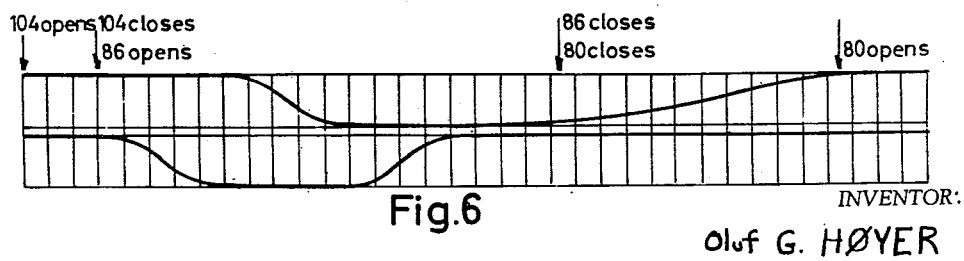
FIG. 6 is a timing diagram.

FIG. 6 illustrates the opening and closing of the valves 80, 86 and 104 in relation to the movement of the driver 30. The upper curve corresponds to the angular or horizontal movement of the driver 30 and the lower curve to the vertical or up and down movement of the driver 30.

The invention is not limited to the embodiments described and illustrated.

For instance it is not necessary to use a damping fluid, as shown, in the chamber 114, although it is preferred to prevent too fast action of the piston in the cylinder 76. The reduction valve 102 can also be omitted; in the embodiment shown it serves to reduce the pressure to a suitable value in the cylinder 76.

The change-over valve comprises a slide which is activated either through the inlet 96 or the inlet 99. When activated through 96 the slide connects 98 with 99 and permits venting of 97 so that pressure medium can escape from the top of 76 through 101. When activated through 99 the slide connects 98 with 97 and permits venting of 100, so that pressure medium can escape from the top of 114 through 113. It will be obvious to the man skilled in the art that the function described can be attained in various other ways.

I claim:

1. Machine for the production of solidified moulded bodies by refrigeration of liquid material comprising a ring-shaped mould consisting of a number of separate mould parts annularly arranged in side by side relationship, each containing a number of refrigerating cells arranged in circular and radial rows, means for rotating said mould in steps in a horizontal path around a stationary axis, a circular row of contact surfaces on the ring-shaped mould corresponding in number to the number of radial rows of refrigerating cells, a reciprocating driving member cooperating intermittently with said contact surfaces for stepwise rotation of the mould, means for altering the length of the steps of said driving member and control means for automatically controlling the alteration of the length of the step at the time when the borderline between two adjacent mould parts is to be crossed.

2. Machine for the production of solidified moulded bodies by refrigeration of liquid material comprising a ring-shaped mould consisting of a number of separate mould parts annularly arranged in side by side relationship, each containing a number of refrigerating cells arranged in circular and radial rows, means for rotating said mould in steps in a horizontal path around a stationary axis, a circular row of contact surfaces in the ring-shaped mould corresponding in number to the number of radial rows of refrigerating cells, a reciprocating driving member cooperating intermittently with said contact surfaces for stepwise rotation of the mould, adjustable means for actuating said driving member to perform at least two advancing steps of different length and control means having an operating feeler, said control means automatically adjusting said actuating means in dependency on the position of the borderlines between adjacent mould parts in relation to the feeler.

3. Machine as claimed in claim 2 wherein the adjustable means for actuating the driving member comprises driving and guiding means, a double-armed lever one arm of which is at one end connected to said guiding and driving means and the other end of which has a slot therein in the form of an arc, a first power transmitting rod at least approximately of a length equal to the radius of said arc and at one end displaceably mounted in said slot and a second power transmitting rod to which the other end of said first power transmitting rod is pivoted for transmitting advancing power to the driving member.

4. Machine as claimed in claim 2 wherein said rotating mould has a plurality of contact members thereon, each corresponding to a borderline between two adjacent mould parts, and said control means comprises an actuating system controlled by said feeler and comprising a positioning member for moving said adjustable means from one position to the other.

5. Machine as claimed in claim 2 wherein said mould has a plurality of step-changing contact members thereon and said control means comprises an inlet for a fluid actuating medium, a feeler valve operated by said feeler and controlling fluid supplied to said inlet, two cam and follower controlled valves to which said inlet is connected, and a working cylinder having a piston for adjusting the length of the advancing step of the driving member and controlled by said cam and follower controlled valves.

6. Machine for the production of solidified moulded bodies by refrigeration of liquid material comprising a ring-shaped mould consisting of a number of separate mould parts annularly arranged in side by side relationship, each containing a number of refrigerating cells arranged in circular and radial rows, means for rotating the mould in steps in a horizontal path around a stationary axis, a circular row of contact surfaces in the ring-shaped mould corresponding in number to the number of radial rows of refrigerating cells, a reciprocating driving member co-operating with said contact surfaces for stepwise rotation of the mould, means for altering the length of the steps and control means for controlling the alteration of the length of the step when the borderline between two adjacent mould parts is to be crossed, said control means comprising a feeler, step-changing contact members on the rotating mould contacting said feeler, an inlet for a fluid actuating medium, a feeler valve operated by said feeler and controlling said inlet, two cam and follower controlled valves to which said inlet is connected, a working cylinder having a piston for adjusting the length of the advancing step of the driving member and controlled by said cam follower controlled valves, said cam controlled valves being mounted so as to have their followers brought into and out of the path of their respective cams, fluid actuated piston and cylinder means for positioning said cam controlled valves, said feeler valve controlling the supply of pressure fluid to said positioning piston and cylinder means belonging to said first cam controlled valve, and a changeover valve connecting said inlet for a fluid actuating medium to said second cam controlled valve and to the positioning piston and cylinder means, said changeover valve being actuated by said first cam controlled valve when actuated by the cam thereof.

7. Machine for the production of solidified moulded bodies by refrigeration of liquid material comprising a ring-shaped mould consisting of a number of separate mould parts annularly arranged in side by side relationship, each containing a number of refrigerating cells arranged in circular and radial rows, means for rotating the mould in steps in a horizontal path around a stationary axis, a circular row of contact surfaces in the ring-shaped mould corresponding in number to the number of radial rows of refrigerating cells, a reciprocating driving member co-operating intermittently with said contact surfaces for stepwise rotation of the mould, means for altering the length of the steps of said reciprocating driving member, and control means for automatically controlling the alteration of the length of the step when the borderline between two adjacent mould parts is to be crossed, said means for altering the length of the steps comprising means for adjusting the individual length of each of the long and short steps of the movement of the ring-shaped mould to accommodate different configurations of refrigerating cells.

8. Machine as claimed in claim 7 wherein the adjustable means for actuating the driving member comprises guiding and driving means, a double-armed lever one arm of which is at one end connected to said guiding and driving means and the other end of which has a slot therein in the form on an arc, a first power transmitting rod at least approximately of a length equal to the radius of said arc and at one end displaceably mounted in said slot, a second power transmitting rod to which the other end of said first power transmitting rod is pivoted for transmitting advancing power to the driving member, manually adjustable stops at each end of said slot for manually adjusting the stroke of said first power transmitting rod and thereby the length of the two advancing steps to correspond with a given mould.

9. Machine for the production of solidified moulded bodies by refrigeration comprising a ring-shaped mould with refrigeration cells arranged in radial rows, means for stepwise turning of the mould around a central stationary axis, step changing means for changing the length of the steps and means rotating synchronously with the mould for automatically actuating said step changing means.

10. Machine as claimed in claim 9, wherein the means for actuating the step changing means comprise cams mounted on a carrier for the mould.

11. Machine as claimed in claim 9, wherein the step changing means comprise a step changing device, cylinder and piston means for actuating said step changing device, two valves for controlling the position of said piston in said cylinder, two pivoted base plates, each carrying one of said valves, means for turning said base plates, and cam means for actuating said valves when brought in proper position.

12. Machine as claimed in claim 9, wherein said step changing means comprise a closed cylinder with inlets at both ends and a piston, a piston rod on said piston, a switching arm to which said piston rod is connected, a guideway link mechanism comprising a double-armed lever, one arm of which is slotted to provide a guideway in which said switching arm is guided and the other arm of which is connected to said mould for stepwise turning of the mould.

13. Machine as claimed in claim 9, wherein said step changing means comprise a closed cylinder with inlets at both ends and a piston, a piston rod on said piston, a switching arm to which said piston rod is connected, a guideway link mechanism comprising a double-armed lever, one arm of which is slotted to provide a guideway in which said switching arm is guided and the other arm of which is connected to said mould for stepwise turning of the mould, and means for oscillating the double-armed lever within a predetermined angle.

14. Machine as claimed in claim 9, wherein said step changing means comprise a closed cylinder with inlets at both ends and a piston, a piston rod on said piston, a switching arm to which said piston rod is connected, a guideway link mechanism comprising a double-armed lever, one arm of which is slotted to provide a guideway in which said switching arm is guided and the other arm of which is connected to said mould for stepwise turning of the mould, and means for oscillating the double-armed lever within a predetermined angle, and further adjustable stop means for adjusting the end position of the said arm guided in the slots and actuated by the piston rod.

References Cited in the file of this patent

UNITED STATES PATENTS

| | | |
|---|---|---|
| 586,563 | Parsons | July 20, 1897 |
| 1,433,175 | Bucklin | Oct. 24, 1922 |
| 2,366,199 | Kunz | Jan. 2, 1945 |
| 2,700,347 | Gram et al. | Jan. 25, 1955 |
| 2,791,890 | Hoyer | May 14, 1957 |